March 8, 1932.                J. M. CALLAWAY                1,848,867
              MACHINE FOR INSERTING COUPLINGS IN FLEXIBLE HOSE
                    Filed March 10, 1930    3 Sheets-Sheet 1

March 8, 1932. J. M. CALLAWAY 1,848,867
MACHINE FOR INSERTING COUPLINGS IN FLEXIBLE HOSE
Filed March 10, 1930 3 Sheets-Sheet 2
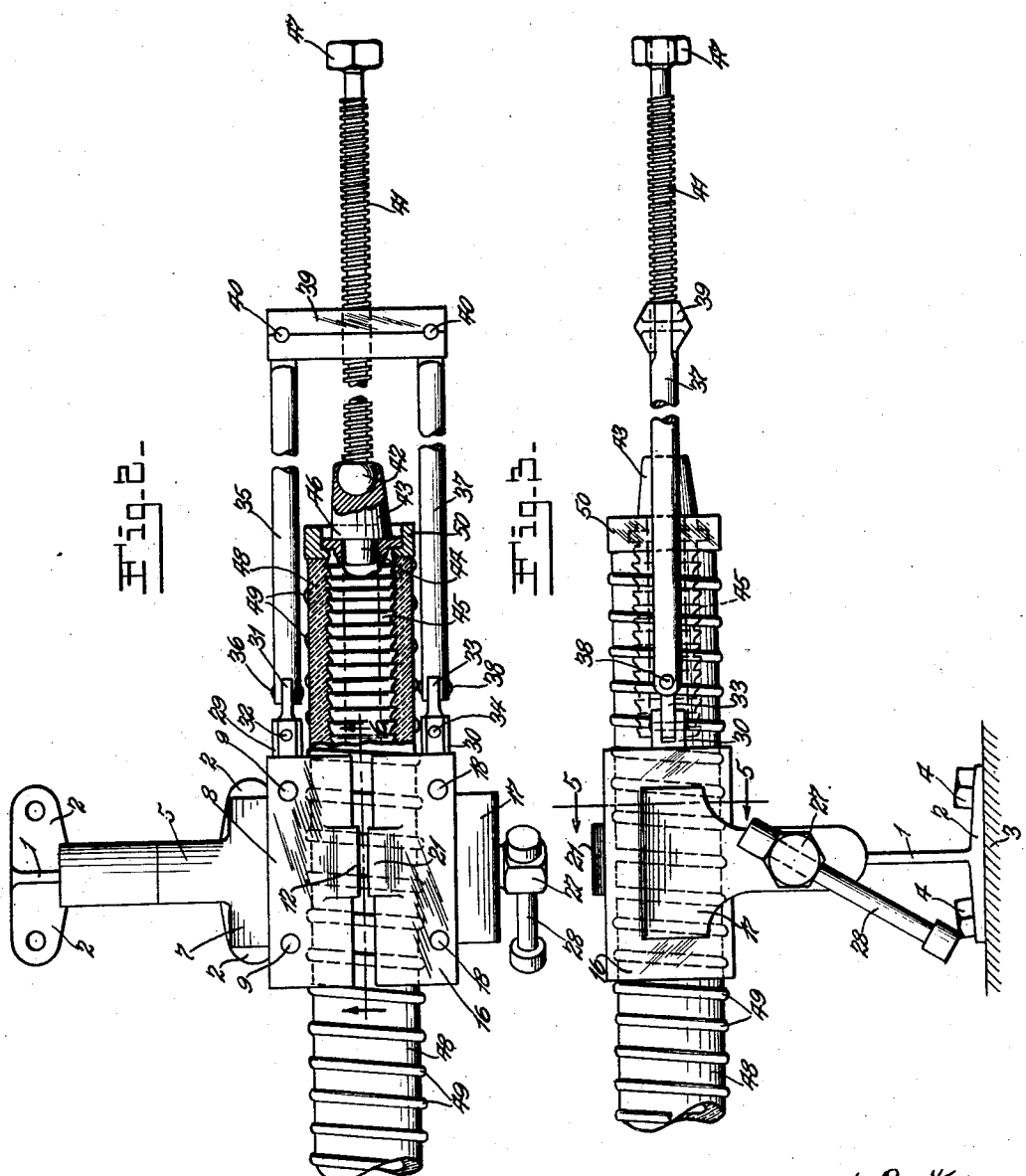
Inventor:
James M. Callaway,
by Rippey & Kingsland,
His Attorneys.

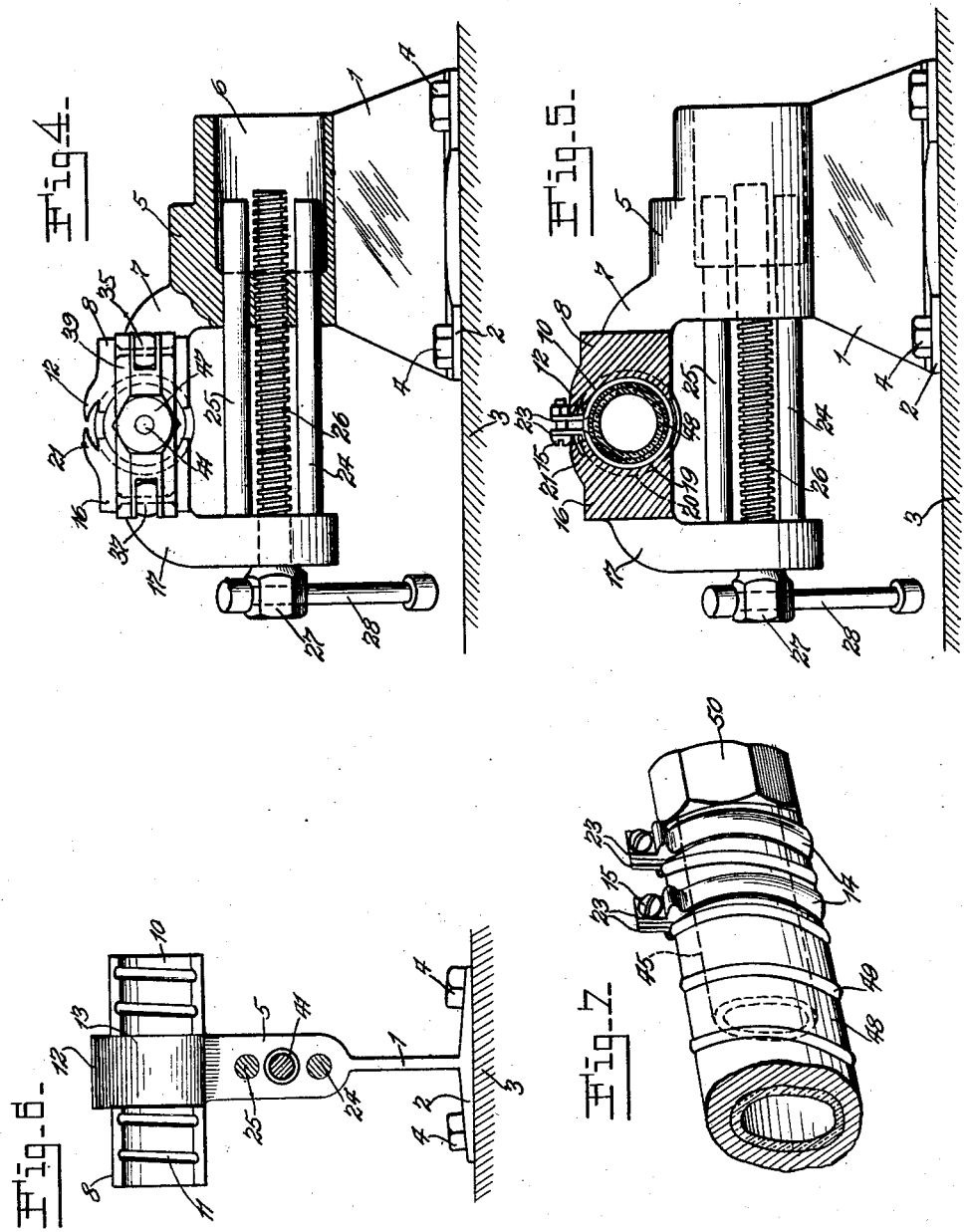

Patented Mar. 8, 1932

1,848,867

UNITED STATES PATENT OFFICE

JAMES M. CALLAWAY, OF ST. LOUIS, MISSOURI

MACHINE FOR INSERTING COUPLINGS IN FLEXIBLE HOSE

Application filed March 10, 1930. Serial No. 434,476.

This invention relates to machines for inserting couplings into the ends of flexible hose.

Objects of the invention are to provide a machine for use in inserting couplings into the ends of flexible hose sections, whereby the couplings may be inserted with safety and accuracy without damaging the material of which the hose is made, and without the necessity or desirability of using soaps, oils or other lubricants, and without removing or reaming out any of the interior of the hose or removing any portion of the wire armor that is wrapped about the hose.
Other objects of the invention are to provide a machine for use in forcing couplings into the ends of flexible hose sections, comprising a vise for clamping upon the hose and supporting the hose in a position in which an end portion of the hose is beyond the vise in position to receive the coupling, and mechanism for engaging and forcing the coupling into the protruding end of the hose by the application of continuous and increasing pressure without the necessity of using hammers or other percussive implements.

Another object of the invention is to provide a machine for clamping and rigidly holding a wire armored flexible hose in a position in which the end portion of the hose extends beyond the clamping device, in combination with mechanism for applying a continuous pressure to a coupling element in order to force the coupling element into the protruding end of the hose without releasing the armor, and without using lubricating substances, and without damaging the hose.

Other objects will appear from the following description, reference being made to the accompanying drawings, in which—

Fig. 1 is a perspective view of my improved machine.

Fig. 2 is a top plan view on a reduced scale as compared with Fig. 1.

Fig. 3 is a side elevation.

Fig. 4 is an end elevation with parts in section.

Fig. 5 is a cross-sectional view on the line 5—5 of Fig. 3.

Fig. 6 is a vertical longitudinal section on the line 6—6 of Fig. 2.

Fig. 7 is a perspective view of an end portion of an armored flexible hose having a coupling inserted therein, and clamps clamping the hose on the coupling.

The machine is of comparatively small dimensions and is readily portable, so that it may be moved from place to place and attached to different supports preparatory for use.

A support 1 has laterally extended flanges or arms 2 at its lower end that are designed to seat upon any suitable rigid support 3 to which it may be desired to secure the machine preparatory for use. The arms or flanges 2 have holes therein through which may be passed fasteners 4 for securing the machine in rigid position upon the support 3.

At the upper end of the supporting portion 3 of the machine, a head 5 is formed having in its rear side a recess 6. The head 5 has an upwardly and forwardly extending portion 7 which is of considerable width and which extends to rigid connection with a vise jaw 8. In the specific embodiment shown, the part 7 extends into the rear side of the vise jaw 8 and these parts are secured in rigid relationship by removable bolts 9. The bolts 9 may be removed to permit detachment and replacement of the vise jaw 8. However, it is clear that the parts 7 and 8 may be rigidly united in other ways than by the use of bolts. The front side of the jaw 8 is formed with a groove or channel 10, the wall of which has approximately the same curvature as the curvature of the periphery of the flexible hose for which the machine is intended. The wall of the groove 10 is provided with a series of inclined grooves or channels 11. These grooves or channels 11 have approximately the same inclination as do the windings of the wire armor about the hose which the machine is intended to clamp. Approximately midway of its ends, the jaw 8 has an upwardly and forwardly curving arm 12, the inner or under side of which is in continuation of the wall of a deep groove 13 in the jaw 8. The groove 13 is deeper than the grooves 11 and is intended to receive one side portion of a hose clamp 14 when the machine is operated to close said clamp 14 upon the hose for attachment thereto by fasteners 15.

The opposite jaw 16 is rigid on the upper end of a support 17. The rigid connection of the jaw 16 with the support 17 may be obtained in different ways, as by means of removable and replaceable bolts 18 passing through said parts and securing them in rigid connection with each other. The jaw 16 is a duplicate of the jaw 8 and has along its inner side a groove 19 matching the groove 10 and having therein inclined grooves 20 similar to the grooves 11 and arranged to receive portions of the wire armor opposite from the portions that are engaged in the grooves 11. Approximately midway of its ends and opposite the arm 12, the jaw 16 has an upwardly and rearwardly curving arm 21, the inner or under side of which is in continuation of the wall of a deep groove 22 in the jaw 16. The groove 22 is opposite the groove 13 and receives the opposite portion of the hose clamp 14 from that portion of said clamp that is engaged in the groove 13. The upwardly extended arms or ears 23 of the hose clamp project upwardly between the adjacent ends of the arms 12 and 21, and are engaged by the ends of said arms when the vise is tightened, so as to clamp the hose clamp securely upon and around the hose. The vise will hold the hose clamp in this closed position on the hose until the fastener 15 is applied.

The support 17 for the jaw 16 has projecting inwardly therefrom a pair of spaced parallel rods 24 and 25 which are mounted for sliding movements in holes in the inner wall of the recess 6, so as to permit the jaw 16 to be moved toward and from the jaw 8. These two spaced parallel rods 24 and 25 perform the additional function of preventing the jaw 16 from moving out of alinement with the jaw 8.

A vise screw 26 projects through a hole in the support 17 and is freely rotative therein. The screw 26 is screwed into a threaded hole in the wall of the recess 6 between the rods 24 and 25 and is parallel with said rods. A head 27 is in rigid connection with the outer end of the vise screw 26 and forms an abutment for the support 17. The handle lever 28 projects through the head 27 and constitutes means for rotating the screw 26 so as to move the jaw 16 toward and from the jaw 8.

A bracket arm 29 projects from one end of the jaw 8, and a similar bracket arm 30 projects from the adjacent end of the jaw 16. A link 31 is mounted for lateral swinging movements on a pivot 32 supported by the arm 29, and a similar link 33 is mounted for lateral swinging movements on a pivot 34 supported by the arm 30. A link 35 has one end mounted on a horizontal pivot 36 supported by the link 31, and a similar link 37 has one end mounted on a horizontal pivot 38 supported by the link 33. The pivots 32 and 34 are parallel with each other, and the pivots 36 and 38 are in axial alinement with each other. The outer ends of the links 35 and 37 are connected by a cross-head 39. Pivots 40 connect the ends of the cross-head 39 with the outer ends of the links 35 and 37, respectively.

A threaded shaft 41 screws through a threaded hole in the cross-head 39 and, at its inner end, has swivel connection 42 with a head member 43. The head member 43 has, at its inner end, a projection 44 designed and intended to extend into the outer end of a hose coupling member 45. A circumferential shoulder 46 is formed at the union of said extension 44 with the body of the head 43, and is arranged to abut against the outer end of the coupling 45. The other end of the threaded shaft 41 has rigid therewith a member 47 constituting a handle, or member for engagement with a tool, whereby the shaft 41 may be rotated.

In the operation of this machine, the handle 28 is operated so as to rotate the threaded shaft or vise screw 26 in a direction to move the jaw 16 away from the jaw 8 to an extent to permit the end of a hose section 48 to be extended between the vise jaws 8 and 16 within the grooves 10 and 19. The end portion of the hose extends beyond the end of the vise a distance sufficient to permit the coupling member 45 to be forced into the extended end of the hose. The wire armor 49 that is wound spirally around the hose 48 is seated in the inclined grooves 11 and 20 formed in the opposite surfaces of the jaws 8 and 16. Then the handle 28 is operated to turn the threaded shaft or vise screw 26 in a direction and to an extent to cause the jaw 16 to press firmly and rigidly against the outer side of the hose section, and thereby press the hose section firmly and securely against the jaw 8. The vise is thus tightened on the hose so that it is impossible for the hose to move longitudinally in the vise.

Next, the end of the coupling member 45 is placed in the end of the hose, and the extension 44 of the head 43 is placed in the outer end of the coupling member in a position in which the shoulder 46 abuts against the end of said coupling member. The swinging frame that supports the threaded shaft 41 is adjusted in position in which said threaded shaft 41 is in axial alinement with the coupling 45 and with the projecting end of the hose 48. Then said shaft 41 is rotated steadily and persistently and in a direction and to an extent to force the coupling member 45 longitudinally into the projecting end of the hose section 48 without the application of percussive blows. I have found that this machine operated in this way will force the couplings into the ends of the hose sections without damaging said hose sections and without the use of any lubricating substances. After the coupling has been forced into the hose so that the abutment 50 that is on the coupling is engaged against the end of the hose, this operation is complete and the shaft 41 is rotated in the opposite direction to detach the head 43 from the end of the coupling member. Or the vise screw shaft 26 may be operated to release the gripping engagement of the vise upon the hose so as to permit the hose to be retracted in a direction away from the head 43.

One of the clamps 14 may be in position in the vise and may be around the hose during the time that the coupling member 45 is being applied, as above described. When the hose is retracted to a position in which the end portion of the hose, in which the coupling member 45 is mounted, is within the vise, the vise is again tightened, causing the arms 12 and 21 to engage against the ears 23 and thus tighten the clamp 14 upon the hose. This tightening of the clamp 14 upon the hose is effected by drawing the ears 23 toward each other. The ears 23 are drawn or pressed toward each other when the vise is tightened by the engagement of the ends of the arms 12 and 21 with said ears 23. The ears 23 project above the arms 12 and 21 a sufficient distance to permit the insertion and application of fasteners 15 in said ears 23. Thus, one or more of the clamps may be tightened around the end portions of the hose so as to clamp the hose securely and rigidly upon the coupling member 45 that extends into the hose. The clamps are tightened and fastened in their tightened positions without cutting or breaking the hose material. Thus, the couplings are applied and secured in the hose sections without any likelihood of damage.

It must now be apparent that my invention obtains all of its intended objects and purposes in a very efficient and satisfactory manner. The machine is capable of satisfactory use in the attachment of couplings to the ends of flexible hose sections in a rapid and easy manner and without any damage whatever to the hose sections, as would result if the couplings were driven in the hose sections by percussive blows.

I am aware that the invention may be varied within the scope of equivalent limits without departure from the nature and principle thereof. I do not restrict myself in any unessential respects, but what I claim and desire to secure by Letters Patent is:—

1. A device of the character described comprising oppositely disposed jaws each having a longitudinal groove opposite the longitudinal groove in the other jaw and the walls of said grooves having inclined grooves therein for the purpose described, supports rigid with and projecting laterally from one of said jaws and having sliding engagement with the other for supporting and guiding said one jaw, mechanism for tightening said jaws on a hose mounted in said longitudinal grooves, and mechanism pivotally supported by said jaws for forcing a coupling into the end of the hose beyond said jaws.

2. A machine of the character described comprising a rigid jaw having a longitudinal groove in its outer side and having inclined grooves in the wall of said longitudinal groove, an opposing jaw having a longitudinal groove in said rigid jaw and having inclined grooves in the wall of said longitudinal groove, rods rigid with said opposing jaw and having sliding engagement with said rigid jaw and supporting said opposing jaw for movement toward and away from said rigid jaw, means for clamping said jaws on a flexible hose mounted in said longitudinal grooves and having its spirally wound wire armor seated in said inclined grooves, and opposing projections rigid with said jaws respectively at their adjacent sides for tightening a clamp on and projecting laterally from that portion of the hose that is between said jaws.

3. A machine of the character described comprising a rigid jaw having a longitudinal hose-receiving groove in its outer side and having a deeper clamp-receiving groove in its outer side and intermediate of its ends, a cooperating movable jaw having in its inner side a longitudinal hose-receiving groove opposite said hose-receiving groove in said rigid jaw and having in its inner side and intermediate of its ends a clamp-receiving groove opposite side clamp-receiving groove in said rigid jaw, said two clamp-receiving grooves being arranged to receive a clamp through which extends a hose in said hose-receiving grooves, spaced supporting members rigid with and supporting one of said jaws and having sliding engagement with the other for guiding said jaws, means for clamping said jaws on the hose, and projections rigid with said jaws for engaging and clamping on the hose the clamp that is mounted in said clamp-receiving grooves as an incident to the clamping of said jaws on the hose.

4. A machine of the character described comprising a rigid jaw having a longitudinal hose-receiving groove in its outer side and having a deeper clamp-receiving groove in its outer side and intermediate of its ends, a cooperating movable jaw having in its inner side a longitudinal hose-receiving groove opposite said hose-receiving groove in said rigid jaw and having in its inner side and intermediate of its ends a clamp-receiving groove opposite said clamp-receiving groove in said rigid jaw, said two clamp-receiving grooves being arranged to receive a clamp through which extends a hose in said hose-receiving grooves, spaced supporting members rigid with and supporting one of said jaws and having sliding engagement with the other for guiding said jaws, means for clamping said jaws on the hose, means pivotally supported by said jaws for forcing a coupling element into the end of the hose, and automatic means for tightening said clamp on the hose automatic and as an incident to the clamping of said jaws on the hose.

5. A machine of the character described comprising two cooperative jaws having grooves in their adjacent faces for receiving a hose and having additional grooves crossing said first named grooves for receiving the spirally wound armor that is on the hose, rods rigid with one of said jaws and having sliding engagement with the other for supporting said one jaw for movement laterally toward and away from said other jaw, means for clamping said jaws on a hose mounted in said first named grooves in a position in which the wire armor about the hose is in said second named grooves, a cross head pivotally supported by said jaws, and a device supported by said cross head for forcing a coupling member into the end of the hose between said jaws.

6. A machine of the character described comprising a pair of cooperating jaws for clamping between them a hose section, mechanism for clamping said jaws on the hose, projections rigid with and projecting from said jaws for clamping a clamping member around the hose, a frame pivotally connected with said jaws, and means supported by said frame for forcing a coupling member into the end of the hose.

7. A machine of the character described, comprising a pair of cooperating jaws for clamping between them a hose section and having grooves in their adjacent surfaces for receiving the armor that is wound spirally around the hose, mechanism for clamping said jaws upon the hose, a frame pivotally connected with said jaws, and means supported by said frame for forcing a coupling member into the end of the hose.

8. A machine of the character described, comprising a pair of cooperating jaws for clamping a hose between them and having grooves for receiving the wire armor that is wound around the hose, means for operating said jaws to clamp the hose, a pair of links having their ends pivoted to said jaws respectively, a cross-head pivotally connecting the opposite ends of said links, a threaded shaft screwed through said cross-head and being movable to position in axial alinement with the hose that is clamped between said jaws, and means for operating said shaft to force a coupling member into the end of the hose.

9. A machine of the character described, comprising a pair of cooperating jaws for clamping a hose between them and having grooves for receiving the wire armor that is wound around the hose, means for operating said jaws to clamp the hose, a pair of links having their ends pivoted to said jaws respectively, a cross-head pivotally connecting the opposite ends of said links, a threaded shaft screwed through said cross-head and being movable to position in axial alinement with the hose that is clamped between said jaws, means for operating said shaft to force a coupling member into the end of the hose, and means for operating said jaws to tighten a clamp upon the hose that surrounds said coupling member.

10. A machine of the character described comprising a rigid jaw, a movable jaw, a number of rods rigid with said movable jaw and having sliding engagement with said rigid jaw and supporting said movable jaw for movement toward and away from said rigid jaw, a threaded shaft in connection with said movable jaw and having threaded engagement with said rigid jaw for moving said movable jaw toward said rigid jaw, means for rotating said shaft, and mechanism pivotally supported by said jaws for forcing a coupling into the end of a hose engaged between said jaws.

11. A device of the character described comprising oppositely disposed jaws, each having a longitudinal groove opposite the longitudinal groove in the other jaw, means for securing one of said jaws in rigid position, a pair of rods having sliding engagement with said rigid jaw and supporting the other jaw for lateral movements toward and away from said rigid jaw, a device for moving said other jaw toward said rigid jaw, and mechanism pivotally supported by said jaws for forcing a coupling into the end of a hose clamped in said grooves.

12. A machine of the character described comprising a pair of cooperating jaws for clamping between them a hose section, rods rigid with one of said jaws and having sliding engagement with the other jaw for supporting and guiding said one jaw in proper relationship to the other jaw, mechanism for operating said one jaw toward the other jaw, a frame pivotally connected with said jaws, and means supported by said frame for forcing a coupling into the end of a hose clamped between said jaws.

JAMES M. CALLAWAY.